Aug. 4, 1953

L. D. SINGLETON 2,647,742

WEIGHING SCALE

Filed June 17, 1946

INVENTOR.
LESTER D. SINGLETON.
BY
ATTORNEY.

Aug. 4, 1953
L. D. SINGLETON
2,647,742
WEIGHING SCALE
Filed June 17, 1946
2 Sheets-Sheet 2
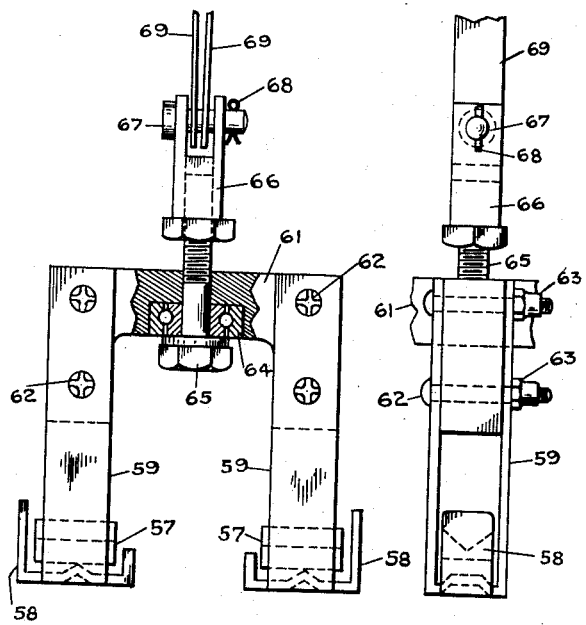
Fig. 3    Fig. 4
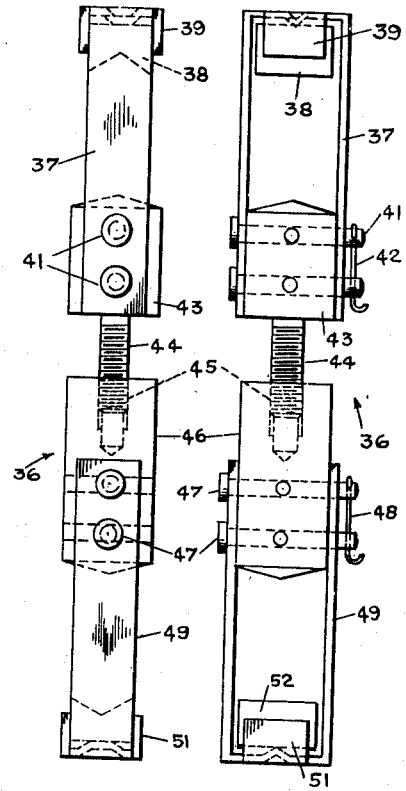
Fig. 5    Fig. 6
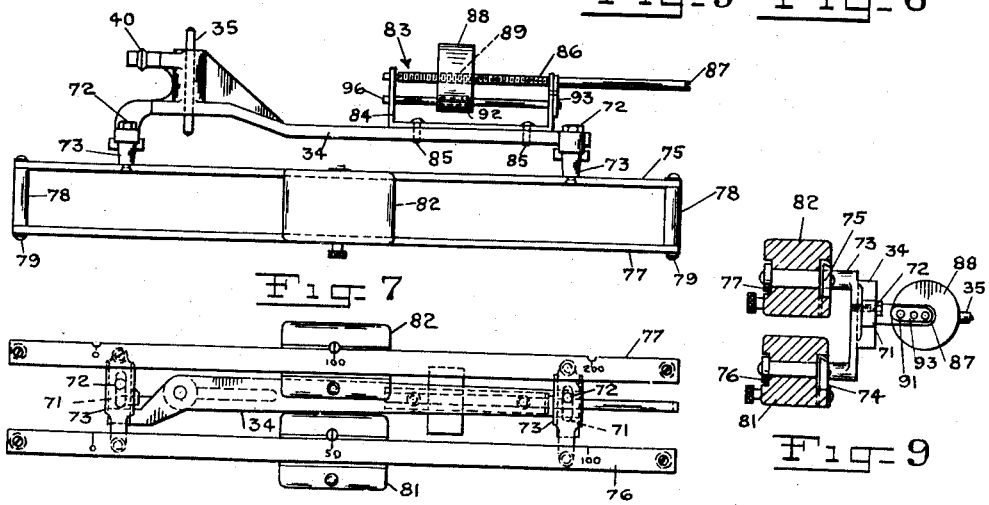
Fig. 7
Fig. 8
Fig. 9
INVENTOR.
LESTER D. SINGLETON.
BY
ATTORNEY.

Patented Aug. 4, 1953

2,647,742

UNITED STATES PATENT OFFICE 2,647,742

WEIGHING SCALE

Lester D. Singleton, Rutland, Vt., assignor to The Howe Scale Company, a corporation of Vermont Application June 17, 1946, Serial No. 677,222

6 Claims. (Cl. 265—61)

My invention relates to weighing scales, and relates more particularly to weighing scales of the type wherein the load is offset or counterbalanced by one or more pendulums.

An important object of my invention is the provision of a novel tare construction for weighing scales of the pendulum type.

Another object of my invention is to provide a tare structure for weighing scales of the pendulum type which will be more compact and less complicated in construction and more efficient in operation.

A further object of my invention is to provide a novel tare beam arrangement.

Still another object of my invention is the provision of a novel means for pivotally supporting the tare beams.

Other objects of my invention, together with certain details of construction and combinations of parts, will appear from the following detailed description.

In the drawings wherein a preferred embodiment of my invention is shown,

Fig. 3 is a detail view, partly in section, of the tape-swivel loop assembly;

Fig. 4 is a side elevational view of the assembly shown in Fig. 3;

Fig. 5 is a detail view of the lever-connecting loop assembly;

Fig. 6 is a side elevational view of the assembly shown in Fig. 5;

Fig. 7 is a top plan view of the tare and capacity beam structure and support;

Fig. 8 is a front view of the tare and capacity beam structure and support, and

Fig. 9 is a cross-sectional view showing the tare poise construction.

Like reference numerals indicate like parts throughout the several views of the drawings.

Figure 2:
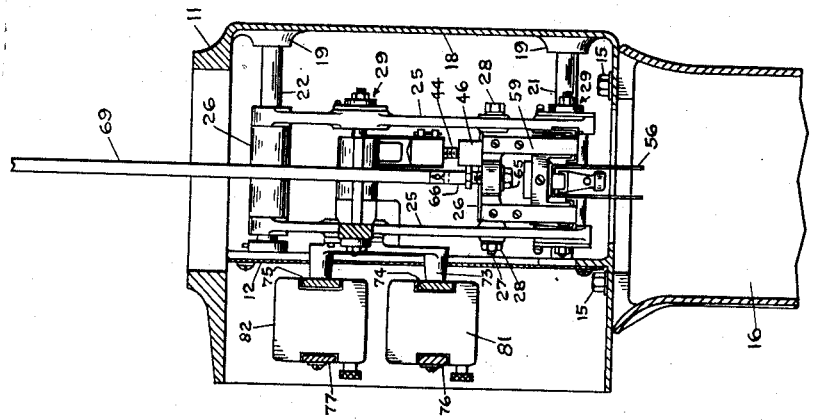
Fig. 2 is a cross-sectional view taken on line 2—2 in Fig. 1.
Figure 1:
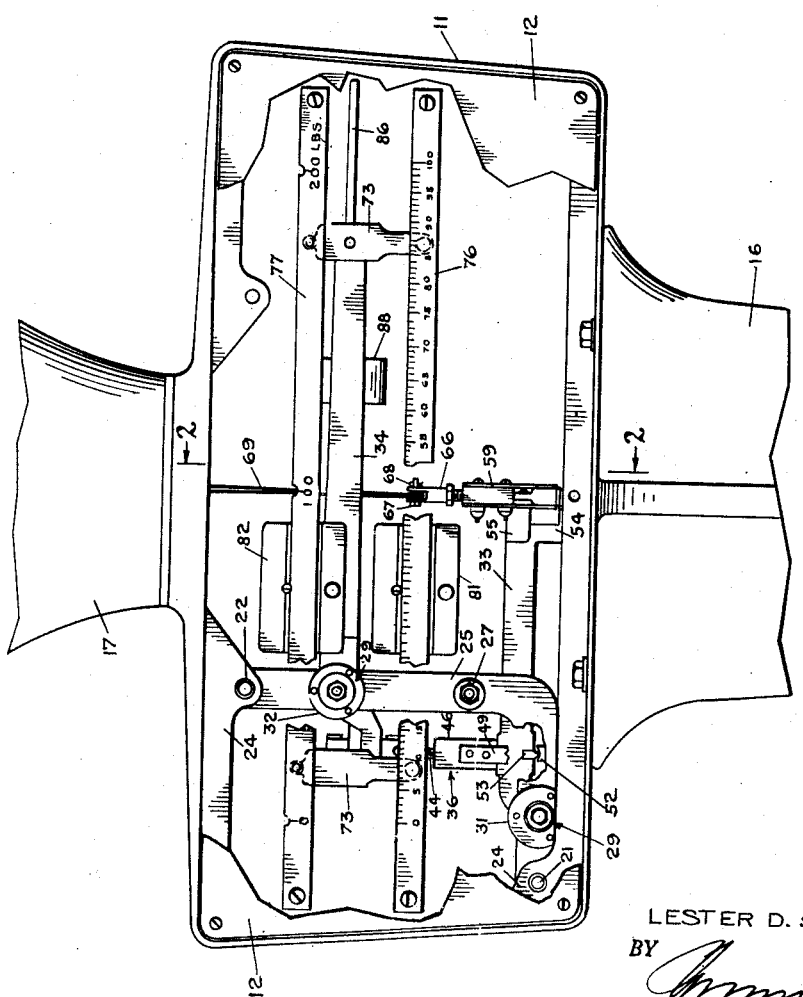
Fig. 1 is a front elevational view of the tare beam housing with the cover-plate, the housing and beams partly broken away to show more clearly certain of the elements making up the tare structure.

Referring to Figs. 1 and 2 of the drawings, the reference numeral 11 designates a housing which normally incloses, with the aid of cover plate 12, substantially all of the tare structure except the tare beam 76 and capacity beam 77. The housing 11 is supported upon and fixed as by bolts 15 to a standard 16 adapted to rest upon a base (not shown) in which the usual platform or main levers are housed. On the housing is supported the casing, fragmentarily shown at 17, for the load offsetting mechanism of the pendulum type.

The inner face of the rear wall 18 of housing 11 is provided with integral bosses 19 in which are supported the rear ends of rods 21 and 22, the front ends of which are supported in integral brackets 24. The rods 21 and 22 have mounted thereon lever fulcrum brackets 25 which are held in spaced relationship by suitable means such as spacer sleeves 26 carried between said fulcrum brackets 25 on rods 21 and 22 and on a threaded shaft 27 maintained in position by nuts 28.

Fulcrum brackets 25 are provided with means, generally indicated by reference numeral 29, for holding and retaining anti-friction bearing assemblies 31 and 32. Suitably pivoted in bearing assembly 31 is lower tare lever 33, which is a lever of the third order, and pivoted in bearing assembly 32 is upper tare lever 34, which is a lever of the first order, the pivoting being effected by means such as shaft 35, as shown in Fig. 7, rigidly fixed in the levers, and supported in the said anti-friction bearings.

The upper and lower levers 34 and 33 respectively are connected by means of a loop assembly shown in Figs. 5 and 6 and generally indicated by reference numeral 36. Said loop assembly comprises a loop 37 having a bearing block 38, held in position on the loop by a clip 39. Bearing block 38 is adapted to rest on a knife-edge pivot 40 fixed in the upper tare lever 34. In the open end of loop 37 is fixed, as by means of clevis pins 41 and wire 42, a block 43 in which is mounted a screw 44. This screw cooperates with a screw-threaded opening 45 in block 46 to provide an adjustable mounting for the latter. Supported on block 46, as by clevis pins 47 and wire 48, is a loop 49, the closed end of which carries in a clip 51 a bearing block 52. Lower tare lever 33 is supported on bearing block 52 through knife-edge pivot 53 supported thereon.

The lower tare lever 33 is provided with an integral offset extension 54 and a set-in extension 55. These extensions are provided with knife-edge pivots (not shown), one of said pivots supporting a shackle 56 connected to the platform levers by a steelyard rod (not shown), as is well-understood in the art. The other of said pivots is supported in bearing blocks 57 mounted in clips 58 in the ends of loops 59 fixed to cross-pieces 61, by means of bolts 62 and nuts 63. The cross-piece 61 is provided with an anti-friction bearing 64 in which is journaled a cap-screw 65 having fixed thereto a yoke 66. In the face ends of said yoke is carried a pin 67 held in position by a cotter pin 68. Tapes 69 are mounted for lateral movement on said pin 67, the tapes being connected to the pendulum cams of the weight offsetting means, as is well-understood in the art. The foregoing swivel mounting for the tapes permits of the turning of the dial head relative to the support therefor whereby the dial head is angularly positioned through 360°, with accurate readings being obtained in any angular position.

Upper tare lever 34 is provided with vertical slots 71 through each of which is passed a screw-bolt 72 for holding in adjusted position relative to said tare lever 34 brackets 73 to 75 to which back poise slide-bars 74 and 75 of tare beam 76 and capacity beam 77 respectively are attached. The tare lever 74 is best shown in Fig. 2. The poise slide-bars are spaced from the tare and capacity beams by spacers 78 held by any suitable means such as pins 79. Tare poise 81 is mounted on back bar 74 and tare beam 76 for movement relative thereto, while capacity poise 82 is similarly mounted on back bar 75 and capacity beam 77.

The upper tare lever 34 has also mounted thereon a zero balancing means generally designated by reference numeral 83. This balancing means comprises a bracket 84 fixed by means of bolts 85 to the upper tare lever. A partly screw-threaded rod 86 is rotatably mounted in bracket 84, being adapted to be rotated by means of a screw-driver or other suitable means which can be inserted in slot 87 in the end of rod 86. A balance ball 88 having a screw-threaded opening 89 is mounted for movement relative to said rod 86, and a guide rod 96, also carried by bracket 84, passes through a smooth-bored opening 92 in said balance ball. A clamp 93 may be provided for holding the rod 86 against turning and thereby maintain the balance ball in adjusted position.

The embodiment of my invention shown and described herein is to be considered merely as illustrative, as the invention is susceptible to variation, modification and change within the spirit and scope of the appended claims.

What I claim as new and desire to secure by Letters Patent is:

1. In a weighing scale of the type having main levers, load offsetting means, a housing, a support consisting of a pair of spaced brackets each having a vertical member fixed in said housing, anti-friction bearings in said vertical members, a tare lever of the first order pivotally mounted in the anti-friction bearings in said vertical members, a tare lever of the third order pivotally mounted in said anti-friction bearings, tare beams carried by said lever of the first order, a poise slidably mounted on each of said tare beams and a knife-edge pivot on each of said tare levers; the combination therewith of a loop assembly connecting said tare levers, said loop assembly comprising two loops each having a bearing member cooperating with the knife-edge pivot on each of said tare levers and means for adjustably connecting said loops, swivel means for connecting said tare lever of the third order to said load offsetting means, and a shackle for connecting said latter tare lever to said main levers.

2. In a weighing scale of the type having main levers, load offsetting means, a housing, a support consisting of a pair of spaced brackets each having a vertical member and a horizontal member fixed in said housing, a tare lever of the first order fulcrumed in said vertical members, a tare lever of the third order fulcrumed in said horizontal members, tare beams carried by said lever of the first order, a poise slidably mounted on each of said tare beams and a knife-edge pivot on each side of said tare levers; the combination therewith of a loop assembly connecting said tare levers, said loop assembly comprising two loops each having a bearing member cooperating with the knife-edge pivot on each of said tare levers and means for adjustably connecting said loops, swivel means for connecting said tare lever of the third order to said load offsetting means, and a shackle for connecting said latter lever to said main levers.

3. In a weighing scale of the type having main levers and load offsetting means, a housing, a support mounted in said housing, a tare lever of the first order and a tare lever of the third order fulcrumed on said support, tare beams carried by one of said tare levers, a poise slidably mounted on each of said tare beams, a knife-edge pivot on each of said tare levers; the combination therewith of a loop assembly connecting said tare levers, said loop assembly comprising two loops each having a bearing member cooperating with the knife-edge pivot on each of said tare levers and means for adjustably connecting said loops, swivel means for connecting said tare lever on the third order to connecting said load offsetting means and a shackle for connecting said latter lever to said main levers.

4. In a weighing scale of the type having main levers and load offsetting means, a housing, a support mounted in said housing, a tare lever of the first order and a tare lever of the third order fulcrumed on said support, tare beams provided with connections to said tare levers whereby the tare beams are movable by said tare levers, a poise slidably mounted on each of said tare beams; the combination therewith of means for operatively connecting said tare levers together, swivel means for adjustably connecting said tare lever of the third order to said load offsetting means, and a shackle for connecting said latter tare lever to said main levers.

5. In a weighing scale wherein the load is offset and counterbalanced by a plurality of pendulums, of the class having a tare structure including a lower tare third order lever, an upper tare first order lever, anti-friction bearing assemblies for said levers, fulcrum brackets for holding and retaining said bearing assemblies, said upper and lower levers having knife-edge pivots; the combination therewith of a loop assembly for connecting said upper and lower levers, said loop assembly including an upper loop with an upper bearing block, a clip holding said block in position, said block resting on the knife-edge pivot on the upper lever, another bottom block on said upper loop provided with a vertical adjustment depending screw, a lower loop having a top block receiving said depending screw in a tapped opening in said top block, said lower loop having a lower bearing block, a clip holding said bearing block in said lower loop, the knife-edge pivot of said lower lever being supported on said lower block.

6. A loop assembly for connecting the upper tare lever and a lower third order tare lever of a weighing scale comprising an upper loop formed of two vertical side plates, a top piece carrying a bearing block, a clip holding said bearing in position, said bearing block resting upon a knife edge pivot on the upper tare lever, a block at the bottom of said loop, clevis pins connecting said block to said side plates, a vertical screw adjustment mounted on said block and a lower loop carried by the lower end of said screw, said lower loop being of the same construction as the upper loop and having a bearing block mounted on a knife edge on the lower tare lever.

LESTER D. SINGLETON.

References Cited in the file of this patent

UNITED STATES PATENTS

| Number | Name | Date |
|---|---|---|
| 175,597 | Fairbanks | Apr. 4, 1876 |
| 691,437 | Bogue | Jan. 21, 1902 |
| 1,267,549 | Hert | May 28, 1918 |
| 1,327,450 | Sweet | Jan. 6, 1920 |
| 1,404,766 | Hem | Jan. 31, 1922 |
| 1,561,688 | Britton | Nov. 17, 1925 |
| 1,626,963 | Osgood et al. | May 3, 1927 |
| 1,664,217 | Kelly | Mar. 27, 1928 |
| 1,667,889 | Hapgood | May 1, 1928 |
| 1,780,411 | Ulrich | Nov. 4, 1930 |
| 1,878,205 | Ulrich | Sept. 20, 1932 |
| 2,208,055 | Hurt | July 16, 1940 |